May 5, 1964
W. G. HANLEY ETAL
3,131,583
METHOD AND DRILL FIXTURE FOR REBORING BRAKE
SPIDER ANCHOR PIN BORES
Filed July 1, 1960
2 Sheets-Sheet 1
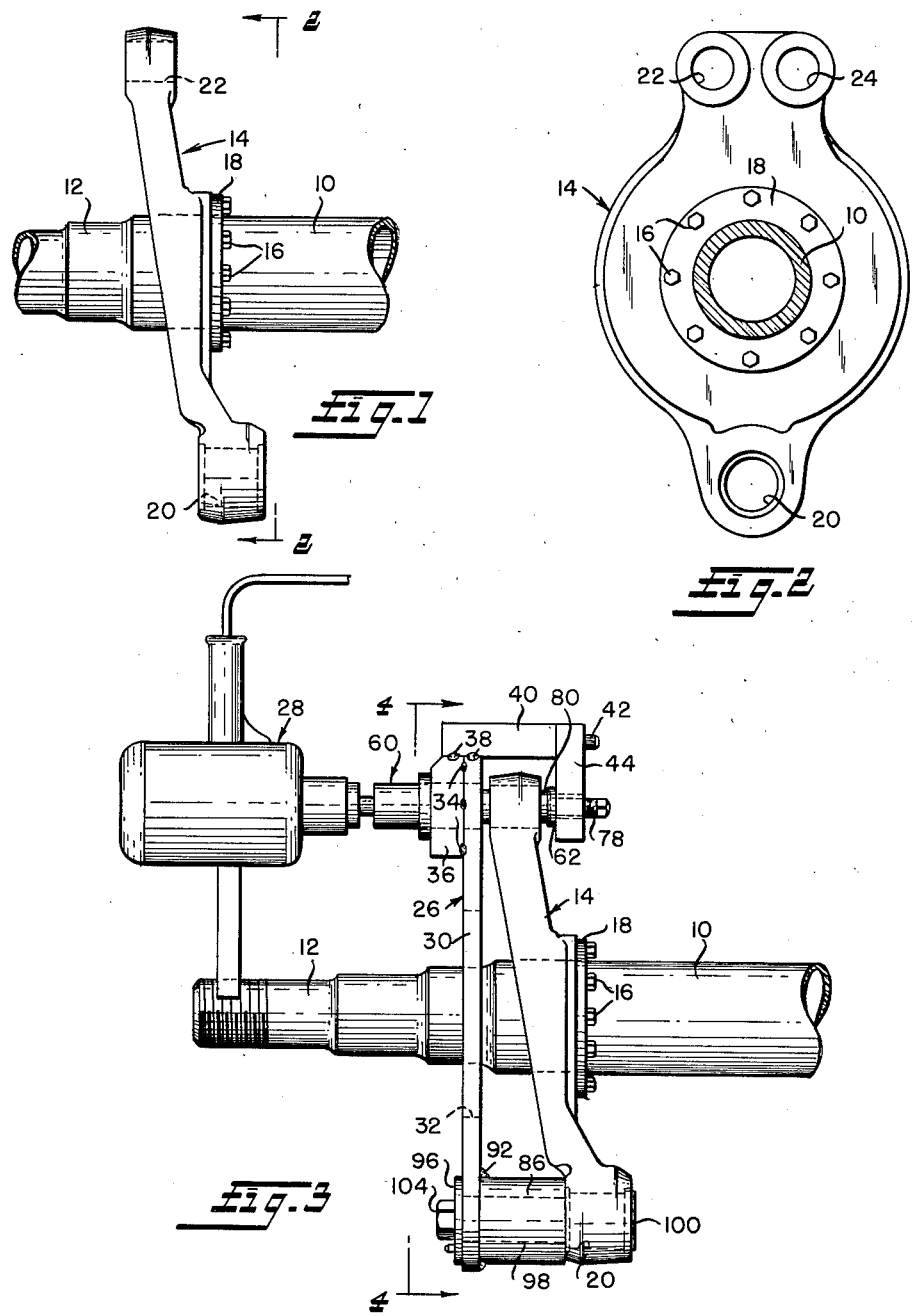
INVENTOR.
William G. Hanley
Ernest McClurg
BY

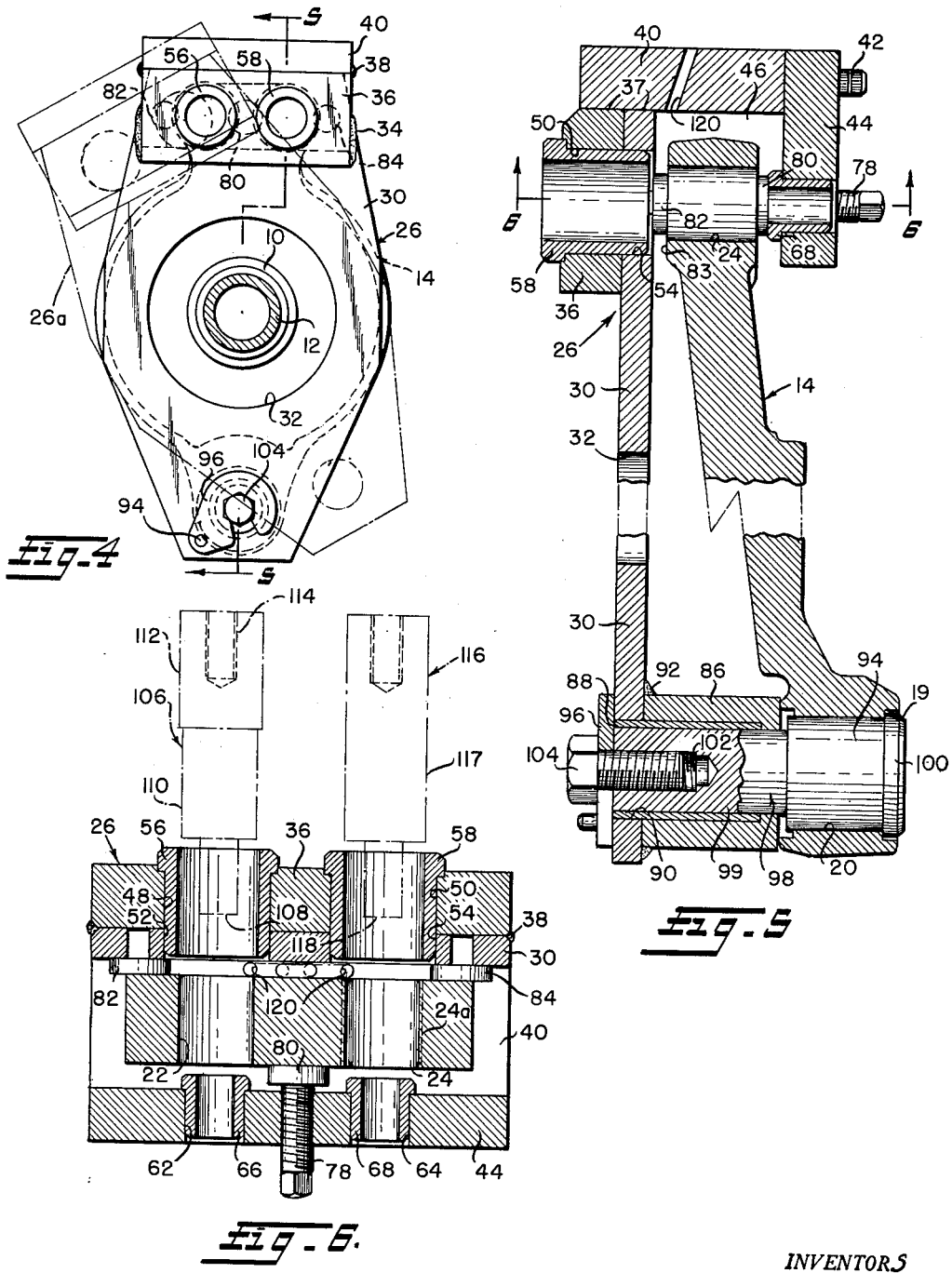

United States Patent Office 3,131,583
Patented May 5, 1964

3,131,583
METHOD AND DRILL FIXTURE FOR REBORING BRAKE SPIDER ANCHOR PIN BORES
William G. Hanley and Ernest McClurg, Kenton, Ohio, assignors to Rockwell-Standard Corporation, Coraopolis, Pa., a corporation of Pennsylvania
Filed July 1, 1960, Ser. No. 40,355
3 Claims. (Cl. 77—2)

The present invention refers in general to drill fixtures and more in particular to a portable drill jig for field use to drill and ream worn brake spider anchor pin holes in automotive vehicle brakes.

In automotive vehicles of conventional designs such as trucks, tractors, buses or trailers it is a common practice to mount all of the wheel brake mechanism except the brake drum which rotates with the wheel on a relatively stationary support plate known in the art as the brake spider. This brake spider is usually non-rotatably secured to the axle or axle housing either by a series of bolts to an integral axle flange or welded directly thereto. Conventional brake mechanisms in vehicles of the class referred hereinto consist in general of two internally expanding brake shoes pivoted or anchored at one end on the brake spider, and the other ends of the brake shoes adapted to be spread apart for drum engagement by means of a rotatable cam having a shaft journalled in the other end of the brake spider. The anchor end of the brake spider is usually provided with two spaced apart through bores or holes to receive hardened anchor pins of the brake shoes, and the opposite end of the brake spider is provided with another through bore to receive a bushing or bearing to support the cam shaft.

During normal usage of the brakes the anchor pin holes become worn due to the fact that hardened pins absorb and transfer the full reaction force during each brake application. Heretofore the usual practice to remedy such wear has been to either replace the whole spider or rebore the anchor pin holes during general brake overhaul which in both cases necessitated the removal of the spider from the axle or, in cases where the spider is welded to the axle, the removal of the entire axle from the vehicle in order to replace the spider or rebore the anchor pin holes, resulting in excessive undesirable idle time of the vehicle and high labor and replacement costs.

The present invention provides an arrangement for eliminating the above disadvantages encountered in remedying worn anchor pin hole conditions in automotive brake mechanisms and provides a considerable saving in idle time, labor cost and/or replacement expenses by eliminating the necessity of removing the axle from the vehicle and/or the brake spider from the axle.

Accordingly, it is an object of the present invention to provide a novel portable drill fixture or jig for automotive brake spider repair to allow quick and inexpensive anchor pin reboring to remedy worn anchor pin holes without having to remove the axle from the vehicle when the spider is welded thereto or the spider from the axle when bolted thereto.

Another object of the present invention is the provision of a novel brake spider drill fixture consisting essentially of an L-shaped plate having a large central aperture in order to be slipped over the axle and spider and providing two bushed holes in axial alignment with the respective anchor pin holes when properly secured to the brake spider by means of an accessory pin inserted through the cam shaft hole and another axially aligned hole in the drill fixture plate opposite the anchor pin drill holes thereof.

A further object of the present invention is to provide in drill fixtures for use in automotive vehicle brake maintenance accurate bore alignment means consisting of cam shaft hole pin, rest buttons and capscrew tightener to allow a quick and secure axial alignment of the drill fixture bores with the anchor pin holes of a brake spider.

Still another object of the present invention is the provision of a lightweight portable drill fixture unit for automotive brake spider anchor pin hole reboring in field maintenance which can be easily packed and carried as a boxed kit and stored in the tool compartment of the vehicle for use by the field mechanic or vehicle operator.

Still a further object of the present invention is the provision of a portable anchor pin hole drill fixture to salvage worn brake spiders which can be used on any standard axle and brake spider assemblies employing anchored brake shoes and providing considerable savings in idle time of the vehicle, maintenance costs and elimination of replacement.

Other objects and novel features will become more evident as the description proceeds with reference to the appended drawings in which:

FIGURE 1 is a fragmentary side elevation of a vehicle axle with an attached or integral brake spider;

FIGURE 2 is an end elevation partly in section along line 2—2 in FIGURE 1;

FIGURE 3 is a side elevation of the axle and brake spider assembly of FIGURE 1 but showing an attached drill fixture according to a preferred embodiment of the present invention, and also illustrating the associated use of a portable hand drill;

FIGURE 4 is an end elevation partly in section along line 4—4 of FIGURE 3;

FIGURE 5 is an enlarged vertical fragmentary cross section through the assembly of FIGURE 4 along line 5—5 of FIGURE 4; and FIGURE 6 is an enlarged horizontal cross section through the anchor pin drill section of the drill fixture and spider on line 6—6 of FIGURE 5 also illustrating the use of alignment pins to be inserted through the drill fixture and anchor pin holes.

FIGURE 1 illustrates one end of a conventional vehicle axle 10 which may be round, rectangular, hollow or solid or any other shape and which at its outer end is provided with a wheel carrying spindle section 12 (FIGURE 3) to accommodate the mounting of a vehicle wheel carrying a brake drum (not shown). Immediately adjacent the spindle action 12 a brake support plate or spider 14 is securely attached to the axle 10 as by bolts 16 coacting with an integral brake flange 18 on the axle. In some axles, the brake spider 14 may be attached to the axle by welding.

Brake spider 14 supports in a conventional application the usual well known brake shoe and actuation mechanism which has been omitted from the drawings for clarity of disclosure and not forming part of the present invention.

FIGURE 2 shows the brake spider 14 at one end as provided with a recessed bore 20 which normally receives a bushing or bearing (not shown) to rotatably support the usual brake cam shaft (not shown). The opposite end of brake spider 14 is provided with the usual spaced apart anchor pin bores 22 and 24 which normally receive the fixed anchor pins (not shown) to pivotally attach the brake shoes (not shown).

Under actual operating conditions the anchor pin bores 22 and 24 become worn due to the reaction forces exerted upon the hardened anchor pins which are rigid with the spider, as by a force fit in the bores. This creates an undesirable play at the anchor points of the brake shoes with the effect that the brake linings wear unevenly and the brake mechanism as a whole does not function properly. To remedy this situation the brake spider must either be replaced or the anchor holes must be rebored and equipped with press fitted bushings to remount the anchor pins. Hitherto, in order to do this work, the brake spider had either to be removed from the axle for reboring or, in cases where the spider is welded on, the entire axle had to be removed to rebore or replace the spider.

In order to overcome this obvious time and cost consuming disadvantage the present invention provides a portable drill fixture 26 which after removal of the wheel can be slipped over the end of the axle 10 and attached to the spider 14 in situ as illustrated in FIGURE 3, the respective anchor pin holes 22 and 24 can be easily and accurately rebored and reamed.

The drill fixture 26 comprises as shown in FIGURE 4 a substantially oval support plate 30 having a large central aperture 32 to allow the plate to be slipped over various size axles. The plate 30 is welded as at 34 at one end to a reinforcing rectangular cross member 36 of substantially thicker cross section for a purpose to appear. If desired plate 30 and cross member 36 may be integral. Plate 30 and cross member 36 are aligned with each other at one end to provide a flush upper surface 37 in FIGURE 5 onto which is welded as at 38 a transverse rectangular bridge member 40 forming the shorter leg of the L-shaped structure. Attached at a right angle to the rear end of bridge member 40 as by pin bolts or dowels 42 is another rectangular cross member 44 extending a short distance toward the axle parallel to plate 30 to provide a three sided enclosure or channel 46 at one end of the drill fixture to accommodate and receive the anchor pin hole end of spider 14 as shown in FIGURE 5. The wheel end of the axle will be referred to as at the front side of fixture 26.

Cross member 36 is provided with two spaced apart parallel cylindrical apertures 48 and 50 coaxial with the spaced anchor pin bores 22 and 24 of spider 14. Plate 30 is likewise provided with cylindrical apertures 52 and 54 in alignment and of equal size as apertures 48 and 50. The respective pairs of apertures 48, 52, and 50, 54 receive press fitted drill bushings 56 and 58 whose internal diameter is slightly larger than the diameter of the cylindrical anchor pin holes 22, 24 to accommodate the insertion of the proper size drill or reamer 60 indicated in FIGURE 3.

The rear or back-up cross member 44 is also provided with two spaced apart smaller apertures 62 and 64 which are axially aligned with apertures 48 to 54 and the respective anchor pin holes 22, 24 (FIGURE 6). Apertures 62 and 64 contain drill pilot and alignment bushings 66 and 68 to receive the pilot end of the drill or reamer 60, or respectively the pilot ends 108 or 118 of alignment pins 106 or 116 as indicated in FIGURE 6 and as will be described hereafter. The rear cross plate 44 is furthermore centrally provided with a tightening screw 78 extending inside the enclosure 46 and having a flat head 80 adapted to abut the rear surface of the spider 14 between the anchor pin bore 22 and 24 for a purpose to appear.

The internal surface of plate 30 opposite member 44 is rigidly provided with two projecting flat rest buttons 82 and 84 adjacent the apertures 52 and 54. These buttons may be formed integral with or press fitted in plate 30. In the assembly rest buttons 82, 84 define a flat planar abutment perpendicular to the axes of apertures 48 and 50 and adapted to engage the front surface 83 (FIGURE 5) of the spider. Rest buttons 82 and 84 are thus adapted to coact with screw 78 to provide a secure abutment and alignment for the spider 14 in relation to the drill fixture 26.

The other end of plate 30 is provided with a tubular extension 86 that projects toward the spider. Extension 86 is preferably ringwelded to plate 30 as at 92 (FIGURE 5) and provided with a conventional replaceable drill bushing 88 which extends through an aperture 90 in the plate 30. The tubular extension 86 is in axial alignment with the cam shaft bore 20 of spider 14 and its length compensates for the offset dimension between the lateral surfaces of the anchor end and cam shaft end of the spider as shown in FIGURES 1, 3 and 5. Adjacent the tubular extension aperture 90 on the outside of the face plate 30 is pivotally secured as at 94 a hook type washer or lock plate 96 for a purpose to appear.

To facilitate manufacturing and to reduce cost and weight the parts 30, 36, 40 and 86 may be made integral as an aluminum casting and the plate 44 removably attached thereto as described.

When it becomes necessary to rebore the worn anchor pin bores at 22, and 24 of the brake spider 14, the wheel, wheel hub, brake drum, bearings, seals and all associated outer brake parts (not shown) are removed from the axle spindle 12 in order to obtain access to the spider 14. Then the cam shaft bushing (not shown) is removed from the spider cam shaft bore 20 and the anchor pin holes 22, 24 are checked to determine the hole having the least wear. Thereafter the fixture 26 is threaded over the axle 10 by the accommodation of the central large aperture 32 as indicated in broken lines 26a in FIGURE 4 and rotated into full line position, so that the enclosure 46 receives the anchor end of spider 14 (FIGURES 3 and 5) and the anchor pin bores 22 and 24 are brought into alignment with the drill bushings 56 and 58 (FIGURES 5 and 6).

Then a large pin 98 is inserted through the cam shaft bore 20 of spider 14 and the corresponding aligned tubular extension 86 of the fixture 26 (FIGURE 5). Pin 98 is provided at the spider end with an enlarged head 100 to abut against the countersunk recess 19 in the cam shaft bore 20, and at the other end with internal screw threads 102 to receive a non-removable capscrew 104. A hook type washer 96 is then swung around and slid under the head of the capscrew which latter is tightened finger tight. Pin 98 has a cylindrical shank portion 94 closely fitted in bore 20 and a coaxial cylindrical shank portion 99 closely fitted within bushing 88.

Thereafter a headless pin 106 (FIGURE 6) having a cylindrical pilot end 108 corresponding in diameter to the internal diameter of the pilot bushings 66 and 68 and a reduced diameter cylindrical midsection 110 is inserted through the fixture drill bushing 56 or 58 into the anchor pin bore 20 entering either pilot bushing 66 or 68 of the rear plate 44 to provide accurate alignment of the anchor pin holes with the drill bushings of the fixture. It will be noted that the diameter of the reduced midsection 110 corresponds to the internal original diameter of the anchor pin holes 22 or 24 before reboring.

The diameter of the cylindrical upper part 112 of pin 106 corresponds to the internal diameter of the drill bushings 56 or 58 and internal screw threads 114 may be provided for attachment of a tool to facilitate the removal of the pin. After full insertion of pin 106, tightening screw 78 is tightened in such way that the spider 14 rests solidly against the rest buttons 82 and 84 at the inside of plate 30 (FIGURE 6). Thereafter the capscrew 104 which has permitted any slight rocking of plate 30 necessary to obtain alignment at the anchor pin end is now completely tightened as by a wrench.

Now the jig 26 is rigidly mounted on spider 14 with drill bushings 56 and 58 coaxially aligned with the anchor pin bores.

Referring to FIGURE 3, a portable hand or electric drill 28 may then be employed, using suitable core drill and reamer 60, to drill and ream the other anchor pin hole, slightly enlarging the diameter thereof as indicated at 24a in broken lines in FIGURE 6. The drill or reamer 60 will preferably likewise have a piloted end (not shown) to fit into the associated pilot bushing 66 or 68 to assure an accurate concentric new bore at 24a.

After drilling and reaming one anchor pin bore, a pin 116 (FIGURE 6) having likewise a pilot end 118 to enter bushing 66 or 68 and a cylindrical body diameter 117 which corresponds to the reamed diameter 24a of the drilled and reamed anchor pin hole is inserted in that hole through drill bushings 56 or 58, and the other pin 106 is now removed. Then the other anchor pin bore 22 or 24 is drilled and reamed as above.

To prevent overheating and for lubricating purposes oppositely slanted channels 120 are provided in the bridge member 40 to allow the introduction of cooling lubricant onto the drill or reamer during the drilling operation.

After the bores 22 and 24 are thus rebored to larger diameter the drill fixture 26 is removed from the spider and bushings (not shown) of suitable size and diameter are press fitted tightly into the rebored anchor pin bores 22 and 24. The inner diameters of these new bushings match the original bore diameter and they accommodate the insertion of standard size anchor pins from stock.

Thus, the present invention provides an inexpensive and time saving arrangement to salvage worn brake spiders in automotive vehicle brakes without the time and cost consuming necessity of removing either the spider from the axle or the entire axle from the vehicle.

The present portable drill fixture provides a lightweight, low cost unit which may be easily stored and transported in any vehicle tool compartment.

The present device is adaptable for any standard size fixed anchor brake having standard anchor pin and camshaft hole spacings.

The present invention may be embodied in other specific form without departing from the essential characteristic or spirit thereof, therefore, the present embodiment is considered in all respects as illustrative only and not restrictive, the scope of the invention being indicated by the appended claims rather than by the foregoing description.

We claim:

1. A fixture for reboring anchor pin mounting holes in an axle mounted brake mechanism spider of the type having a cam shaft mounting bore and two adjacent brake shoe anchor pin mounting bores, said fixture comprising a generally L-shaped support having a long leg and a short leg at one end thereof and means in said long leg providing adjacent the short leg a pair of side-by-side drill guide bushings adapted to align with the anchor pin bores, and a tubular extension at the other end of said long leg projecting in the same direction as said short leg and adapted to abut the spider in alignment with the cam shaft bore and means defining lubricant admission bores in said short leg for lubricating a drill extending through said guide bushings.

2. A portable fixture for reboring anchor pin mounting holes on an axle mounted brake mechanism spider of the type having a cam shaft mounting bore and two adjacent brake shoe anchor pin mounting bores comprising a generally L-shaped support having a long leg and a short leg at one end thereof and means in the long leg providing adjacent the short leg a pair of side by side drill guide bushings adapted to align with the anchor pin bores, a tubular extension at the other end of said long leg projecting in the same direction as said short leg and adapted to abut the spider in alignment with the cam shaft bore, a first holding pin adapted to extend through said cam shaft bore and said tubular extension to rockably mount said support and clamping means for releasably fixing said support on said pin, and a second holding pin adapted for mounting one or the other of said drill guide bushings to extend into the associated anchor pin bore while the other bore is being drilled.

3. A portable fixture for attachment to a vehicle axle for reboring anchor pin and like bores in an axle mounted brake spider having a cam shaft mounting bore at one side of the axle and two adjacent anchor pin mounting bores at the other side of the axle comprising a support adapted to be removably but rigidly attached to the spider, means on said support providing a pair of drill guide bores in alignment with said anchor pin bores, means on said support providing a bore in alignment with the cam shaft bore, holding means comprising a pin extending through said bore aligned with the cam shaft bore and into the cam shaft bore for rockably mounting said support and means for releasably clamping said support to said pin, said support being formed at the end opposite from said bore aligning with said cam shaft bore with an inwardly directed channel within which the anchor pin bore side of said spider is adapted to be received with the drill guide bores being provided in one side of said channel, and means providing at least one lubricant admission bore in the portion of said support forming said channel for lubricating a drill extending through said drill guide bores.

References Cited in the file of this patent

UNITED STATES PATENTS

| | | |
|---|---|---|
| 883,869 | Fortin | Apr. 7, 1908 |
| 1,744,095 | Auten | Jan. 21, 1930 |
| 1,805,443 | Walters et al. | May 12, 1931 |
| 2,660,778 | Gerner | Dec. 1, 1953 |
| 2,731,858 | Evans | Jan. 24, 1956 |
| 2,875,513 | Dulin | Mar. 3, 1959 |